(12) United States Patent
Kristensen

(10) Patent No.: US 8,752,337 B2
(45) Date of Patent: *Jun. 17, 2014

(54) TOWER PART FOR A WIND TURBINE, AN APERTURE COVER SYSTEM, A METHOD FOR MANUFACTURING A TOWER PART AND USES HEREOF

(75) Inventor: Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,242

(22) Filed: Jan. 24, 2012

(65) Prior Publication Data
US 2012/0117898 A1 May 17, 2012

Related U.S. Application Data

(63) Continuation of application No. 11/718,961, filed as application No. PCT/DK2004/000780 on Nov. 10, 2004, now Pat. No. 8,109,061.

(51) Int. Cl.
*E04H 12/00* (2006.01)
*F03D 1/00* (2006.01)

(52) U.S. Cl.
CPC .......... *E04H 12/003* (2013.01); *F05B 2230/60* (2013.01); *F05B 2240/912* (2013.01); *F03D 1/001* (2013.01); *Y02E 10/728* (2013.01)
USPC ................ 52/40; 52/651.07; 52/835; 52/854

(58) Field of Classification Search
USPC ........... 52/40, 651.01, 561.07, 834, 835, 843, 52/848, 854
See application file for complete search history.

(56) References Cited

U.S. PATENT DOCUMENTS 3,550,637 A * 12/1970 Briden ........................... 138/92
3,935,633 A 2/1976 Bunker
(Continued)

FOREIGN PATENT DOCUMENTS

DE 35 04 840 8/1986
EP 0066340 * 5/1982 ............. F21V 21/10
(Continued)

OTHER PUBLICATIONS

G. O'Shea; International Search Report issued in International Application No. PCT/DK2004/000780; Jul. 26, 2005; 3 pages; European Patent Office.
(Continued)

*Primary Examiner* — Jessica Laux
(74) *Attorney, Agent, or Firm* — Wood, Herron & Evans, LLP

(57) ABSTRACT

The invention relates to a tower part for a wind turbine including at least one wall segment and at least one aperture segment including at least one aperture. The wall segment and the aperture segment are connected and the aperture segment is of a substantially uniform thickness and is thicker than the thickness of the wall segment. The invention further related to an aperture cover system for covering at least one aperture in a tower part for a wind turbine including cover plates and attachments for attaching the system to the tower part, wherein the attachments do not affect the fatigue limit of the tower part. Finally, the invention relates to a method for manufacturing a wind turbine tower part and uses thereof.

26 Claims, 9 Drawing Sheets

(56) References Cited

U.S. PATENT DOCUMENTS

| | | | | |
|---|---|---|---|---|
| 4,590,718 A | * | 5/1986 | Angeloff | 52/116 |
| 5,513,477 A | * | 5/1996 | Farber | 52/848 |
| 5,847,318 A | * | 12/1998 | Chapman | 174/45 R |
| 6,357,549 B1 | * | 3/2002 | Brennan et al. | 182/133 |
| 6,470,645 B1 | * | 10/2002 | Maliszewski et al. | 52/745.18 |
| 6,532,700 B1 | | 3/2003 | Maliszewski et al. | |
| 2003/0147753 A1 | * | 8/2003 | Ollgaard | 416/244 A |
| 2004/0172881 A1 | | 9/2004 | Minami | |

FOREIGN PATENT DOCUMENTS

| | | | | |
|---|---|---|---|---|
| EP | 0 066 340 | | 12/1982 | |
| GB | 527 107 | | 10/1940 | |
| GB | 1 079 237 | | 8/1967 | |
| WO | 02/38891 | | 5/2002 | |
| WO | 03/036085 | | 5/2003 | |
| WO | 03/069099 | | 8/2003 | |
| WO | 2004/031578 | | 4/2004 | |
| WO | 2004/067959 | | 8/2004 | |
| WO | 2004/083633 | | 9/2004 | |
| WO | WO2004083633 | * | 9/2004 | F03D 11/04 |

OTHER PUBLICATIONS

Jessica L. Laux; Office Action issued in priority U.S. Appl. No. 11/718,961; May 25, 2010; 28 pages; U.S. Patent and Trademark Office.

Jessica L. Laux; Office Action issued in priority U.S. Appl. No. 11/718,961; Sep. 30, 2010; 21 pages; U.S. Patent and Trademark Office.

Jessica L. Laux; Office Action issued in priority U.S. Appl. No. 11/718,961; Dec. 2, 2010; 21 pages; U.S. Patent and Trademark Office.

Jessica L. Laux; Office Action issued in priority U.S. Appl. No. 11/718,961; Feb. 16, 2011; 18 pages; U.S. Patent and Trademark Office.

Jessica L. Laux; Office Action issued in priority U.S. Appl. No. 11/718,961; Jun. 23, 2011; 20 pages; U.S. Patent and Trademark Office.

Lars Magnus Stiebe; Notice of Opposition filed in European Patent Application No. EP-1856410-B1; Mar. 9, 2011; 42 pages; European Patent Office.

Strange Skriver; Article entitled "Danske Vindmoller (1): Portraet AF Micon's 250 KW Molle" with English Translation; 3 pages.

Skriver 1-5; different aspects of the Micon 250 kW Turbine described by Skriver; 5 pages.

Skriver—6; Micon Technical Specification Micon M530—250 KW; 8 pages.

Skriver—7; Article entitled Unsicherheit uber Unternehmensgewinne Wachst; Mar. 29, 2001; 1 page.

I. Lavassas et al.; "Analysis and design of the prototype of a steel 1-MW wind turbine tower"; Feb. 20, 2003; Thessaloniki, Greece.

Marc Seidel; "Experiences with two of the world's largest wind turbine tower"; 4 pages.

Tony Burton et al.; Wind Energy Handbook; Copyright 2003; 14 pages; West Sussex, England.

International Standard; "Welding and allied processes—Joint preparation—Part 2: Submerged arc welding of Steels"; Apr. 1, 1998; 13 pages; Geneve, Switzerland.

Jordi Ventura Sobredo; Declaration; Feb. 23, 2011; 2 pages; Barcelona.

Vestas Wind Systems A/S; Article entitled "Revista Internacional de Energia y Medioambiente"; Apr. 2004; Ano VIII No. 81; 7 pages.

Print-out from internet showing current state of wind power installations in Galicia, Spain; Mar. 4, 2001; 5 pages.

Print-out from Wikipedia entitled "Welding Joints"; 5 pages.

Josep Frats I Mustaros; Declaration; Jan. 24, 2011; 36 pages; Barcelona.

\* cited by examiner

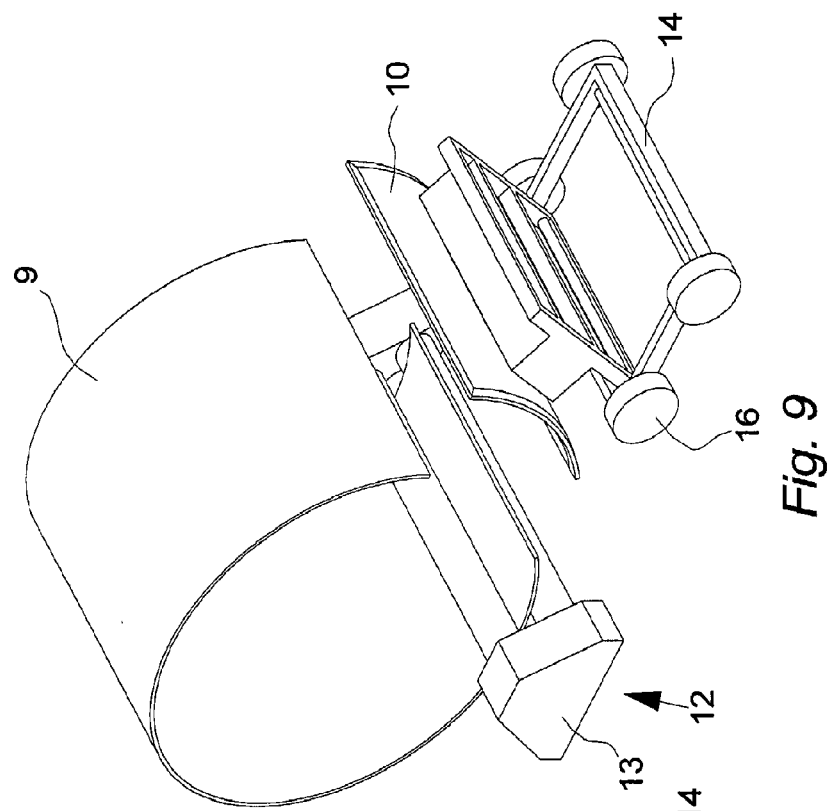
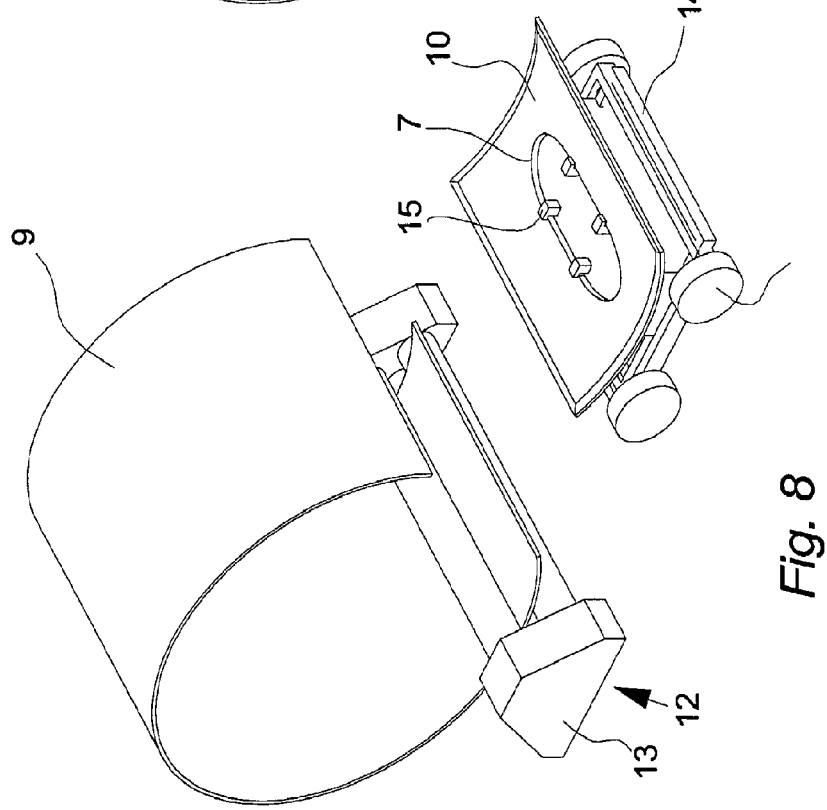

TOWER PART FOR A WIND TURBINE, AN APERTURE COVER SYSTEM, A METHOD FOR MANUFACTURING A TOWER PART AND USES HEREOF

CROSS-REFERENCE TO RELATED APPLICATIONS

This application is a continuation of U.S. application Ser. No. 11/718,961, filed Jun. 26, 2007, which application was a U.S. national phase application of PCT/DK2004/000780, filed Nov. 10, 2004. Each of these applications is incorporated by reference herein in its entirety.

TECHNICAL FIELD

The invention relates to a tower part for a wind turbine, an aperture cover system, a method for manufacturing a tower part and uses hereof.

DESCRIPTION OF THE RELATED ART

A wind turbine known in the art typically comprises a wind turbine tower and a wind turbine nacelle positioned on top of the tower. A wind turbine rotor, comprising three wind turbine blades, is connected to the nacelle through a low speed shaft, which extends out of the nacelle front as illustrated on FIG. 1.

The wind turbine tower typically comprises a number of round tower parts mounted on top of each other, where each tower part is made of a steel plate rolled into a circular shape and welded to constitute a closed ring. The tower parts are assembled by welding into transportable sections at the manufacturing plant for wind turbines. When the different sections, that constitute the wind turbine tower, have been transported to the site at which the tower is to be erected, the sections are connected by flanged joints.

To access the nacelle on top of the wind turbine tower of the fully mounted wind turbine, the tower is usually provided with a ladder on the inside of the tower, and a tower part close to or at the bottom of the tower is provided with an aperture to enable access to the inside of the tower, and a door to cover and seal this aperture. This tower part or other rings in the tower can also be provided with apertures for e.g. cables, lamps or other things. An aperture is usually made by flame cutting a hole in the tower part.

A door aperture comprises a thick door frame welded to the edge on the inside of the aperture, to compensate for some of the loss of strength in the tower part caused by the hole. But since welding reduces the tower parts fatigue limit and thereby its strength, the tower part for accommodating a door is also made of a thicker plate than what would be necessary to make a similar tower part of substantially the same strength without a door aperture. As the ring is of uniform thickness, most of the ring is thicker than necessary.

Furthermore on wind turbines known in the art most of the equipment attached to the tower part such as door hinges, covers for ventilation holes, flight warning lamps, cable fixating means and other are typically attached by welding. This reduces the tower parts fatigue limit and to compensate for this loss of strength even thicker plates and/or bigger door frames are demanded.

Consequently, the known tower part with aperture has the problem of being quite heavy and complicated and thus expensive to manufacture.

A way to provide a similar tower part with a door aperture is disclosed in international patent application no. WO-A 031036085. Here a casted door frame is welded into a door aperture of a standard wind turbine tower. Any connections on the door frame such as door hinges and locks may be casted with the door frame. Since cast iron is more brittle than the steel the wind turbine tower is made of, the cast iron door frame has to be considerably heavier than if it was made of the same steel as the rest of the tower.

Furthermore a foundry is considerably more expensive than a rolling mill. The equipment to make such a cast iron door frame would be considerably more expensive in purchase and in use, than the equipment to roll the tower parts.

Compared to rolling, casting takes much specialised knowledge both in the design of the cast iron parts and to manufacture them, while rolling is a more commonly used and simple process. The required welding technique in order to connect cast iron and a regular steel plate is also quite demanding.

Consequently, the disclosed solution in international patent application no. WO-A 031036085 also has the problem of being quite heavy and complicated and thus expensive to manufacture.

Further, the weight of the wind turbine tower parts is a significant and increasing problem, both in handling and in transport.

The invention is intended to minimize the use of material in a wind turbine tower part with aperture such as a door aperture.

The invention further simplifies the way the wind turbine tower part with aperture is manufactured in order to reduce production costs.

The invention presents a way to cover the apertures in the tower parts without reducing the tower parts fatigue limit.

BRIEF SUMMARY OF THE INVENTION

The invention provides for a tower part wherein the aperture segment is of a substantially uniform thickness and is thicker than the thickness of the wall segment.

By making the aperture segment of a substantially uniform thickness, it can be made out of an ordinary steel plate. In the quality normally used to make tower parts, steel plates are relatively inexpensive in purchase and relatively easy to machine, roll and weld.

By making the aperture segment thicker than the wall segment, strength is provided to the section of the tower part where it is needed. Hereby the wall segment can have the same thickness as if it constituted a full tower part without aperture, which contributes considerably to minimising consumption of material and hereby the weight of the tower part.

It shall be emphasised that the term "aperture" refers to any kind of opening such as e.g. a hole, gap, slit or cleft in any form of shape.

It shall further be emphasised that the term "segment" refers to an angular portion cut off from a geometrical figure, such as the geometrical figure of a round tower part.

Even further it shall be emphasised that the term "thickness" refers to the segments radial extent e.g. in a round tower part.

In an aspect of the invention, both the aperture segment and the wall segment are made of steel plates. Steel is a strong, rigid and a relatively inexpensive material with good rolling, machining and welding qualities, which makes it the preferred material for making tower part segments and tower parts in towers for modern wind turbines. Furthermore steel has good magnetic qualities which make it possible to attach accessories such as e.g. ladders, doors, hinges and lamps to the tower parts by means of magnets.

In an aspect of the invention, the wall segment and the aperture segments are connected by welding. Hereby it is possible to make a strong and rigid joint between them, and at the same time keep the consumption of material at a minimum.

In an aspect of the invention, the tower part is substantially round or has a polygonal shape. By making the tower part round, according to the invention a minimum of material is used. The wind pressure on the wind turbine blades creates a considerable bending moment, which the wind turbine tower has to stand. Since the nacelle can turn in any direction to always face the wind, the tower has to stand bending moments from all sides. In view of this a round tower is the preferred design in modern wind turbine towers.

By giving the tower and hereby the tower part a polygonal shape it is possible to shape the tower part and hereby the wall and aperture segments by bending, by pressing or a combination of the two. Pressing or bending could be an advantageous method of manufacturing tower parts.

It should be emphasised that the term "round" or "polygonal" not in any way restricts the tower part to being cylindrical. The invention relates to tower parts which can be both cylindrical and of a non-constant diameter shape in the vertical direction such as e.g, conical.

In an aspect of the invention, the aperture segment is four sided, which enables the aperture segment to be made of an ordinary plate, preferably a steel plate, which further enables a relatively simple manufacturing process of both the aperture segment and the wall segment.

However it should be emphasised that this does not restrict the aperture segment to having a square or rectangular shape. If the tower and hereby the tower part is conical, the aperture segment could also have a substantially conical shape in that the aperture segment could be wider at the bottom than at the top. Or to minimize the use of material it could be advantageous to make the sides of the aperture segment nonlinear e.g. with rounded corners or by following the shape of the aperture making the sides for example round or shaped as part of an ellipse.

In an aspect of the invention, the at least one wall segment and at least one aperture segment forms segments of a ring and when connected by said connecting means constitute a full 360° ring.

Both the aperture segment and the wall segment can be made of rolled plates which reduces production costs, in that both segments can be shaped by the same production method, which reduces investments in production equipment. By rolling the aperture segment call be made of steel of the same quality as the wall segment. This provides the joints between the aperture segment and the wall segment with considerably more strength, than if the aperture segment was made of e.g, cast iron, when joining them by welding.

In an aspect of the invention, the aperture segment constitutes between 5° and 180°, preferably 30° and 100° and most preferred 40° and 80° of the full 360° tower part. Hereby is obtained an advantageous relation between strength and weight of a tower part comprising the aperture segment and the wall segment.

In an aspect of the invention, the at least one aperture segment has a width which is between 10% and 500%, preferably 50% and 300% and most preferred 100% and 200% wider than the total width of the at least one aperture as seen in a horizontal cross section of the aperture segment where the at least one aperture is widest.

With the width ranges of an aperture segment it is possible obtain an efficient use of material in the tower part with a compensation for the loss of strength caused by the aperture.

Further, the distance between the aperture and the connections to the wall segment are enough to avoid significant lines of force through the connections.

The term "horizontal" refers to an aperture segment in a tower part mounted in an erected wind turbine tower.

In an aspect of the invention, the wall segment has an outer diameter of between 1 meter and 10 meters, preferably 2 meters and 6 meters and most preferred 3 meters and 5 meters. The outer diameter of the wall segment has to correspond with the outer diameter of the tower parts above or beneath said wall segment, to make a strong and rigid wind turbine tower. At a given nacelle weight, a given wind turbine height and a given maximum bending moment in the tower, there are primarily two factors that can be adjusted in the construction of a traditional wind turbine tower; namely the diameter of the tower and the thickness of the tower parts. The preferred design of the tower is found by adjusting these two factors to get the strongest tower with a minimum use of material.

In an aspect of the invention, at least two edges on said aperture segment are sharpened. By sharpening the edges it is possible to make a smooth junction between the aperture segment and wall segment and to the tower parts above and beneath the aperture segment. A smooth junction is preferred in that it leaves no edges for e.g. water, snow or dirt to gather and it enables an advantageous link tension wise between the different material thicknesses. However it should be emphasised that the sharpening not necessarily have to be linear. To optimize the distribution of stresses in the junction between the different material thicknesses, it could be advantageous to make the sharpening non-linear or partially non-linear.

In an aspect of the invention, at least two opposite edges on both the concave and the convex side of said aperture segment are sharpened e.g. substantially to a thickness of said wall segment. By sharpening the edges both on the inside and on the outside of the tower, it is possible to make a smooth junction between the aperture segment and wall segment and to the tower parts above and beneath the aperture segment, both on the inside and the outside of the tower. This also enables substantially identical welding seams on the inside and on the outside of the segment connection, which provides the tower part with very little internal tension caused by the welding.

In an aspect of the invention, all four edges on both the concave and the convex side of said aperture segment are sharpened.

In an aspect of the invention, the pitch diameter of the aperture segment is substantially the same as the pitch diameter of the wall segment.

The term "pitch diameter" is to be interpreted as the diameter of the circle going through the middle of a segment as seen in a top or bottom view, and by the middle is meant where the radial distance to the inside and to the outside, of the rolled plate of which the segment is made, is equal.

By "Centering" the aperture segment in the wall segment, it is relatively simple to manufacture and assemble the wall and aperture segment, in that the aperture segment can be sharpened the same way on the inside and the outside, and in that it is easy to determine the correct position of the aperture segment in relation to the wall segment during assembling.

In an aspect of the invention, the pitch diameter of the aperture segment is smaller than the pitch diameter of the wall segment.

By making the pitch diameter of the aperture segment smaller than the pitch diameter of the wall segment, the aperture segment is positioned a little into the tower part. This is advantageous in that it enables a uniform distribution of the tension forces between the inside and the outside of the tower part.

In an aspect of the invention, the wall segment has a thickness of between 5 millimeters and 120 millimeters, preferably 15 millimeters and 90 millimeters and most preferred 20 millimeters and 70 millimeters.

The preferred design of the tower and hereby the wall segment is found in a relation between the segments wall thickness and the diameter of the tower to get the strongest tower with a minimum use of material. With the thickness ranges of a wall segment it is possible to obtain an efficient use of material in the tower part.

In an aspect of the invention, the aperture segment is between 10% and 500%, preferably 50% and 250% and most preferred 80% and 180% thicker than the thickness of the wall segment. By this thickness range of the aperture segment an advantageous relation between the aperture segment thickness and its strength is achieved.

In an aspect of the invention, the height of the wall segment is between 1 meter and 10 meters, preferably 1.5 meters and 5 meters and most preferred 2 meters and 4 meters. This height range provides for an advantageous relation between the wall segment height, the ability to handle it and the cost of producing it.

In an aspect of the invention, the aperture segment is of substantially the same height as the wall segment. By this both manufacturing and the process of joining the different segments are made simple.

In an aspect of the invention, the at least one aperture in the at least one aperture segment is made by flame cutting. Flame cutting is an inexpensive, fast and relatively simple process of making an aperture in a plate, preferably a steel plate, which traditionally makes flame cutting the preferred method for cutting relatively thick steel plates.

It shall be emphasised that the term "flame cutter" refers to any kind of plasma cutter, laser cutter or flame cutter.

In an aspect of the invention, the at least one aperture in the at least one aperture segment is a door aperture with a door connected to said aperture segment by means of one or more magnetic hinges. By connecting the hinges of the door to the aperture segment by means of magnetism, the segment is not weakened by internal tension, as e.g. welding would do. Avoiding a weakening around the aperture is especially preferred as the lines of force are concentrated here.

In an aspect of the invention, said door aperture is of a substantially oval shape with vertical parallel sides and round endings in the longitudinal direction. In modern wind turbine towers, this is a preferred door aperture design in that it minimises the risk of dangerous stress concentrations, and thereby allows for a minimum use of material.

In an aspect of the invention, the at least one aperture segment and/or the at least one wall segment is given a substantially circular shape by rolling, in that rolling is the preferred method for providing workable plates and especially steel plates with a circular shape.

In an aspect of the invention, the tower part is a tower ring. By making the tower part as a single tower ring the tower part becomes easy to manufacture.

The invention further provides for an aperture cover system for covering at least one aperture in a tower part for a wind turbine, said system comprising one or more cover plates and one or more attachment means for attaching said system to said tower part, wherein said attachment means do not affect the fatigue limit of said tower part.

The lines of force are concentrated around the apertures and by attaching covers e.g. by welding, the tower part is weakened where strength is particularly needed. This problem is solved by attaching the aperture cover in a way which does not affect the fatigue limit and hereby the strength of the tower part.

In an aspect of the invention, the attachment means are magnetic means and/or adhesive means. Magnets and/or adhesives are a relatively simple, reliable and inexpensive method of attaching accessories such as aperture covers to the tower part.

In an aspect of the invention, said aperture cover system being a door with hinges attached to said tower part by means of magnetism. The problem of covering the apertures without reducing the tower parts fatigue limit, is particularly pronounced when the aperture is a door aperture, in that the door aperture is often the biggest aperture in a tower and the door is usually placed at the bottom of the tower where the concentration of stresses are the highest. The effect of using the aperture cover system to connect a door to the tower part by magnetic hinges is therefore particularly pronounced.

The invention further provides for a method for manufacturing a wind turbine tower part comprising at least one aperture segment and at least one wall segment, said method comprising the steps of, establishing said at least one wall segment as less than a full 360° ring, establishing an aperture in said aperture segment, fixating one of said segments in a fixating unit, moving the other segment to a position in proximity of the segment in said fixating unit and connecting the segments by connection means. By this method an advantageous procedure for manufacturing the tower part with aperture is achieved.

By using a fixating unit for fixating either the wall segment or the aperture segment and then positioning the other segment in a position at where it can be joined with the fixated segment, provides a relatively simple method for stabilising the segments during the connection, which enables advantageous circumstances for making the connection between the segments of good quality, especially if the connection is done by welding.

In an aspect of the invention, a method for manufacturing a wind turbine tower part includes the connection of at least one wall segment of a given thickness and at least one aperture segment of a substantially uniform thickness and being thicker than the thickness of said wall segment. By this an advantageous embodiment of the invention is achieved.

An aspect of the invention provides for, a method for manufacturing a wind turbine tower part, wherein said at least one aperture segment and said at least one wall segment are made by rolling.

An aspect of the invention provides for, a method for manufacturing a wind turbine tower part, wherein at least two edges on said aperture segment are sharpened.

An aspect of the invention provides for, a method for manufacturing a wind turbine tower part, wherein at least two opposite edges on the concave and the convex side of said aperture segment are sharpened e.g. substantially to a thickness of said wall segment.

An aspect of the invention provides for, a method for manufacturing a wind turbine tower part, wherein the connections between said at least one aperture segment and said at least one wall segment comprises welding.

An aspect of the invention provides for, a method for manufacturing a wind turbine tower part, wherein the fixating unit is a rolling mill or part hereof. By using the rolling mill for fixating the wall segment or the aperture segment when joining the segments, provide for a method which does not require a separate fixating unit and the cost thereto.

An aspect of the invention provides for, a method for manufacturing a wind turbine tower part, wherein the manufacturing takes place at a manufacturing plant of a wind turbine plant. By manufacturing the wind turbine at the manufacturing plant transportation and handling of the different wind turbine parts are reduced.

The invention further provides for use of a tower part for establishing one or more apertures in a wind turbine such as door openings, cable openings, and openings for ventilation or warning lights. By this an advantageous embodiment of the invention is achieved.

An aspect of the invention provides for, use of a method for manufacturing a wind turbine tower part for establishing one or more apertures in a wind turbine such as door openings, cable openings, openings for ventilation or warning lights. By this an advantageous embodiment of the invention is achieved.

BRIEF DESCRIPTION OF THE FIGURES

The invention will be described in the following with reference to the figures in which FIG. 1. illustrates a large modern wind turbine;

FIG. 8 illustrates in perspective a manufacturing method of a wind turbine tower part where a cart with an aperture segment is moved to a position in proximity of a fixating unit with a wall segment;

FIG. 9 illustrates a method step that includes the cart with the aperture segment being in a tilted position;

DETAILED DESCRIPTION OF THE INVENTION

Figure 1:
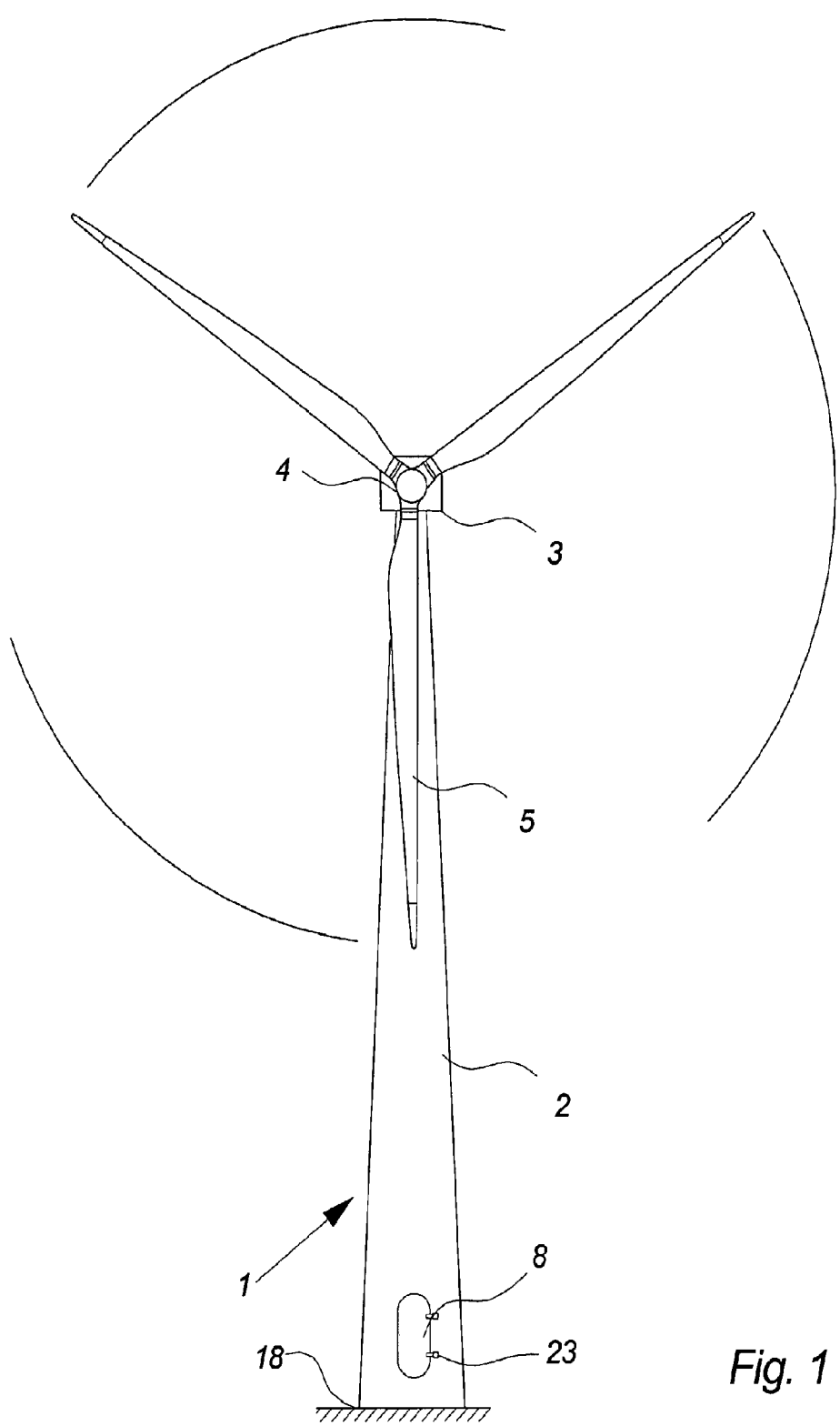

FIG. 1 illustrates a modern wind turbine 1 mounted on the foundation 18 comprising a tower 2 with a door 8 attached to the tower 2 by means of hinges 23, and a wind turbine nacelle 3 positioned on top of the tower 2. The wind turbine rotor 4, comprising three wind turbine blades 5, is connected to the nacelle 3 through the low speed shaft which extends out of the nacelle 3 front.

The different components of a wind turbine 1 are usually transported separately to the site of mounting and assembled there e.g. the different tower sections, the nacelle 3 and the wind turbine blades 5.

Figure 2:
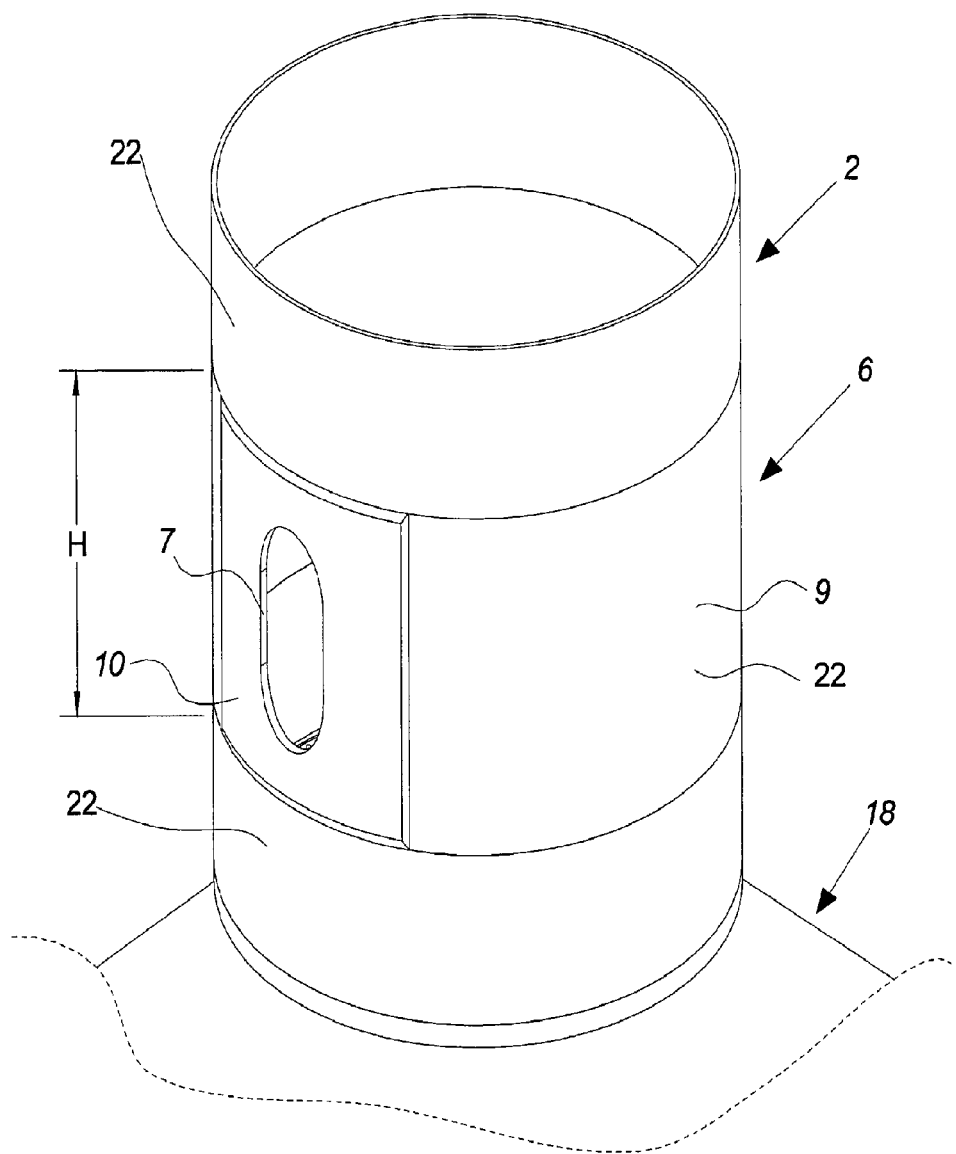
FIG. 2 illustrates an embodiment of a tower part of a wind turbine tower comprising a wind turbine tower part with a door aperture as seen in perspective.

FIG. 2 illustrates a lower part of a wind turbine tower 2 comprising a tower part 6 with a door aperture 7 for accommodating a door (not shown). In this embodiment of the invention the tower part 6 comprises a wall segment 9 and an aperture segment 10, which in this case results in the tower part 6 constituting a tower ring 22. The tower part 6 with door aperture 7 is joined to the neighboring tower rings 22 by connecting means such as screws, bolts, rivets, gluing or welding. In normal use in a wind turbine tower the tower part 6 is welded to the tower rings 22 above and beneath. In another embodiment the top and/or the bottom of the tower part 6 is provided with a flange for connecting the tower part 6 to the tower ring 22 above and/or the tower ring 22 or foundation beneath by use of fasteners such as screws, bolts, rivets or other. Furthermore the figure illustrates that in this embodiment of the invention the aperture segment 10 is of substantially the same height as the wall segment 9. The dimension H shows that the term height is to be interpreted as the concerned objects extend in the vertical direction on a fully erected wind turbine tower 2.

In an embodiment of the invention the door aperture 7 can be provided with a door (not shown) connected to the aperture segment 10 e.g. by means of magnetic hinges.

FIG. 2 further illustrates a circular embodiment of a part of a wind turbine tower 2, but in another embodiment the rings and hereby the tower 2 could be conical, with a decreasing diameter upwards.

In an embodiment of the present invention, the wall segment 9 is made of a relatively thin plate which is rolled into a circular shape of a diameter determined by the size of the wind turbine 1 in which the tower part 6 and thereby the tower 2 is to be used. When rolled the wall segment 9 does not constitute a full 360° tower part 6, but has an opening for accommodating at least one aperture segment 10.

The aperture segment 10 is made of a plate thicker than what the wall segment 9 is made of, and rolled into a circular shape with substantially the same diameter as the wall segment 9. Before or after the aperture segment 10 is rolled, at least one aperture 7 is cut in said segment 10, by means of a flame cutter or another metal cutting device.

If more than one aperture 7 is needed in a tower part 6, more than one aperture segment 10 could be welded to at least one wall segment 9, so that the three or more segments together constitute a full tower part 6. For example two aperture segments positioned horizontally next to each other such as a door segment and a cable segment and both connected to the wall segment.

In another embodiment of the invention, the aperture segment 10 could be provided with more than one aperture 7. This could for instance be the case if a tower part 6 needed to be provided with both a door and an aperture for a main cable, ventilation or other (not shown).

A wind turbine tower 2 can also be provided with more than one tower part 6 with aperture 7. This could be the case if e.g. a tower part 6 close or at the bottom of the tower was provided with e.g. a door aperture 7 and another tower part 6 at or close to the top of the tower 2 was provided with one or more apertures 7 e.g. for airplane warning lamps (not shown).

In this embodiment of the invention the figure also illustrates that when the wall segment 9 and the aperture segment 10 are joined, by some sort of connecting means such as screws, bolts, rivets, gluing or preferably welding (not shown), they together constitutes a full 360° substantially round tower part 6. In another embodiment of the invention the tower part could have a polygonal shape of at least three sides.

Figure 3:
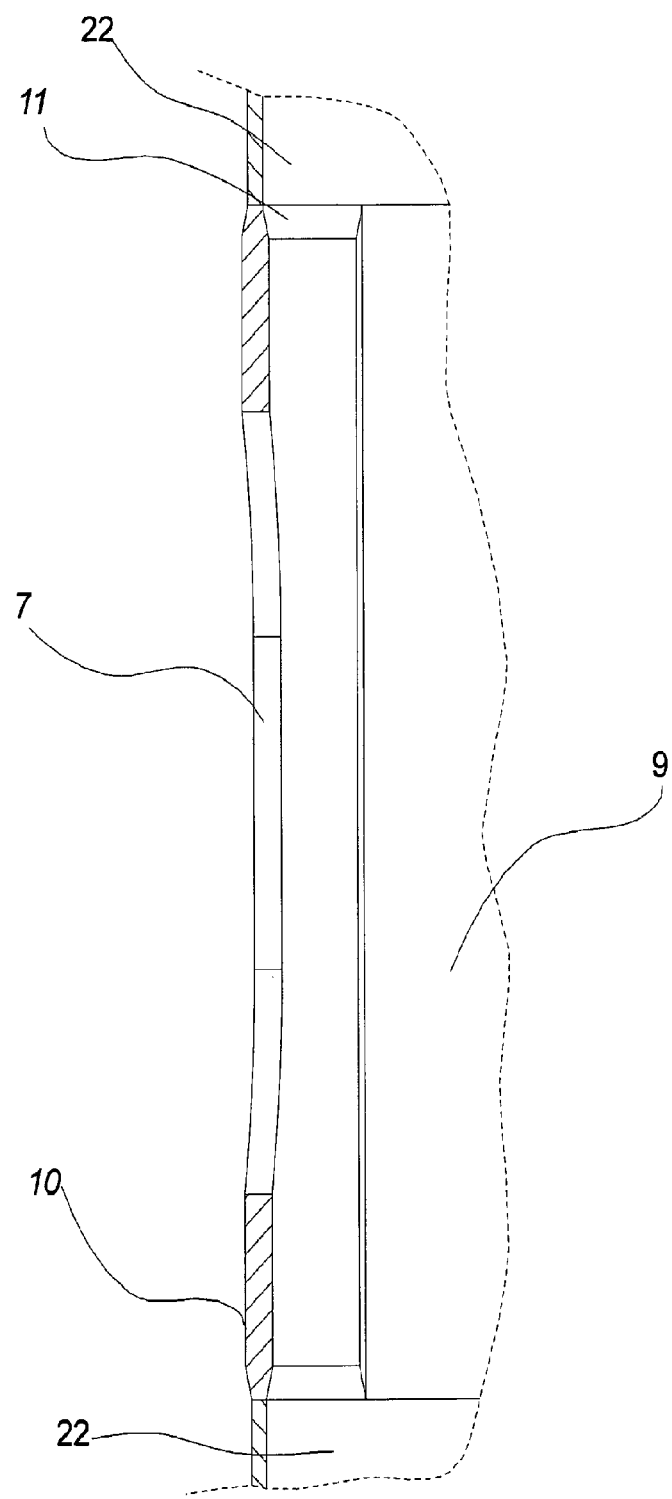
FIG. 3 illustrates the wind turbine tower part with a door aperture in a vertical cross section through the middle of the door aperture as seen from the side.

FIG. 3 illustrates the tower part 6 comprising a wall segment 9 and an aperture segment 10 with door aperture 7 in a vertical cross section through the middle of the door aperture 7.

In an embodiment of the invention all four edges on both the concave and the convex side of the aperture segment 10 are provided with a sharpening 11. In an embodiment of the invention the sharpening 11 of the top and bottom edges of the aperture segment 10 results in that the aperture segment 10 ends up being of the same thickness as the neighbouring tower rings 22 above and beneath. The sharpening 11 on the top and bottom edges could advantageously be made before the aperture segment 10 is rolled into the circular shape. In another embodiment of the invention the sharpening 11 could be non-linear e.g. having the shape of a part of an ellipse and/or the edge between the sharpening 11 and full material thickness of the aperture segment 10 could be rounded.

Figure 4:
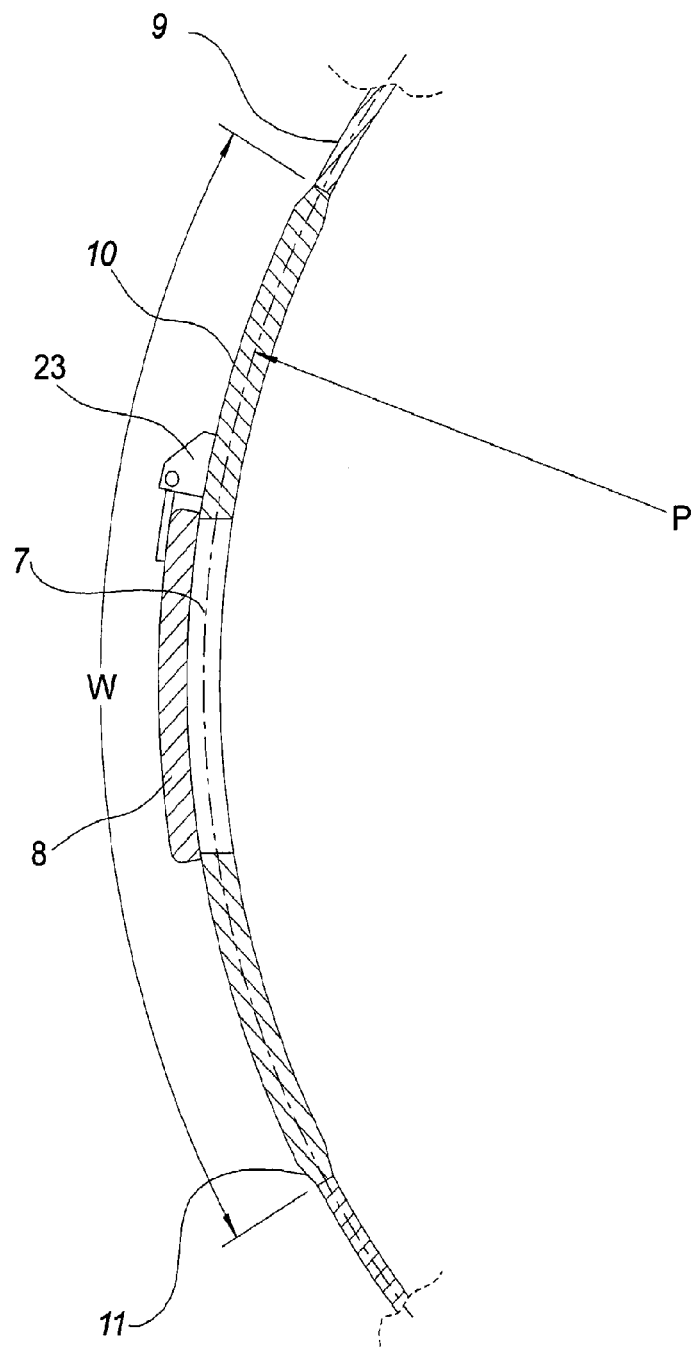
FIG. 4 illustrates the wind turbine tower part with a door aperture and door in a horizontal cross section through the middle of the door aperture as seen from the top.

FIG. 4 illustrates the tower part 6 comprising a wall segment 9 and an aperture segment 10 with a door aperture 7 and a door 8 in a horizontal cross section through the middle of the door aperture 7.

In an embodiment of the invention all four edges on both the concave and the convex side of the aperture segment 10 are provided with a sharpening 11. In an embodiment of the invention the sharpening 11 on the side edges of the aperture segment 10 results in the aperture segment 10 ends up being of the same thickness as wall segment 9. Because of the way a traditional rolling machine known in the art functions, the sharpening 11 on the side edges of the aperture segment 10 would preferably not be made until after the aperture segment 10 has been rolled into the circular shape.

The illustrated aperture segment 10 is for accommodating one door and therefore the aperture segment 10 is provided with only one aperture 7. In this embodiment of the invention the width of the aperture segment 10 is approximately three times the width of the aperture 7, where the aperture is positioned symmetrically in the aperture segment 10. The dimension W shows that the term width is to be interpreted as the peripheral extend of the segment. If the aperture 7 in the aperture segment 10 is a 0.7 meter wide door aperture 7 and the tower part 6 has an outer diameter of e.g. 4 meters, the aperture segment 10 would be approximately 2.1 meters wide, which in this case constitutes about 60° of the full 360° tower part.

In this embodiment of the invention FIG. 4 also illustrates that, the pitch diameter of the wall segment 9 and the aperture segment 10 is coincident. The dimension P shows these coincident pitch diameters. In another embodiment of the invention the aperture segment could be made with a pitch diameter smaller than the wall segments pitch diameter.

The width of the aperture segment 10 is determined by the size and the numbers of apertures 7 in the aperture segment 10. In an embodiment of the invention, if an aperture segment 10 is to be provided with one aperture 7, the width of the aperture segment 10 would approximately be three times the width of the aperture 7, in that horizontally the aperture 7 would be positioned substantially in the middle of the aperture segment 10 with a part of the aperture segment 10 of approximately the same width as the aperture 7 on both sides of the aperture. If the aperture segment 10 is provided with more than one aperture 7 the width of the aperture segment 10 would be determined by the sizes of these apertures 7 and how they are positioned on the aperture segment 10.

FIG. 4 further illustrates a door 8 covering the aperture 7. In this embodiment of the invention the door 8 is connected to the tower part 6 by means of one or more hinges 23. The hinges 23 could be attached to the tower part by means of e.g. screws, bolts, rivets, welding or other, but more preferred the hinges 23 are connected in a non-destructive way which does not weaken the tower part 6. Attaching in a non-destructive way could be by magnets, adhesive means such as glue or a combination of the two.

Figure 5:
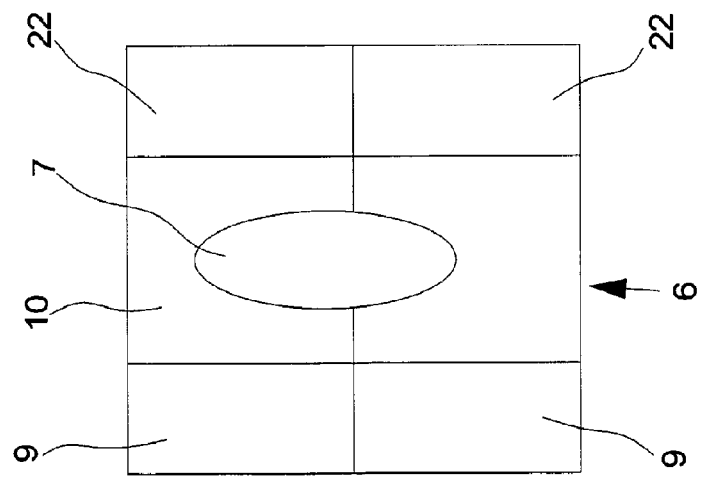
FIG. 5 illustrates an embodiment of a tower part comprising two wall segments and two aperture segments.

FIG. 5 illustrates an embodiment of a tower part 6 comprising two wall segments 9 and two aperture segments 10. If an aperture 7 is of a size, that it is higher than a tower ring 22, the aperture 7 could be made by e.g. welding two tower rings 22 together, each comprising an aperture segment 10 provided with a cut-off constituting a part of the total aperture 7.

Figure 6:
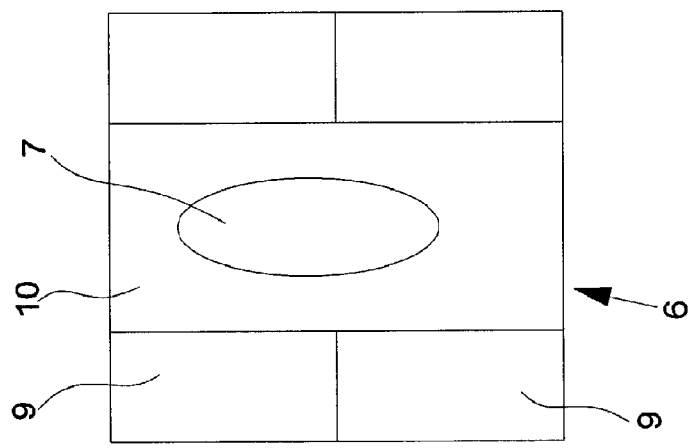
FIG. 6 illustrates an embodiment of a tower part comprising two wall segments and one aperture segment.

FIG. 6 illustrates an embodiment of a tower part 6 comprising two wall segments 9 and one aperture segment 10. If an aperture 7 is of a size that it is higher than a tower ring 22, the aperture 7 could be made by e.g. welding two wall segments 9 onto one aperture segment 10 having the same height as two wall segments 9.

Figure 7:
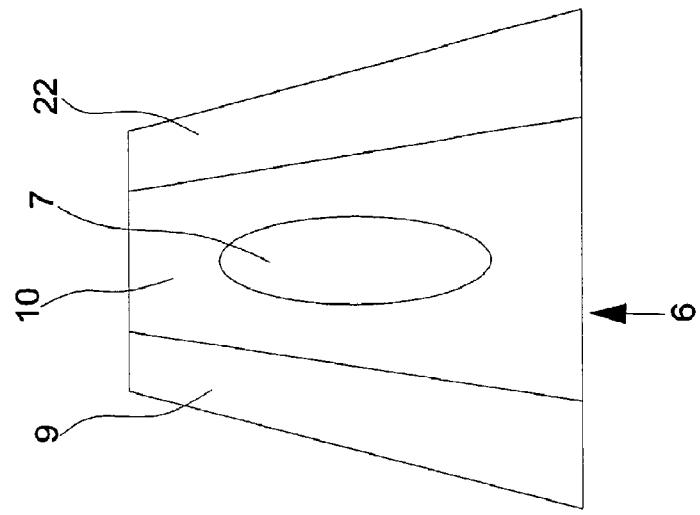
FIG. 7 illustrates an embodiment of a conical tower part.

FIG. 7 illustrates an embodiment of a conical tower part 6, where the sides of the aperture segment 10 is linear but not parallel. In another embodiment of the invention the corners of the aperture segment 10 could be rounded, or the sides could follow the shape of the aperture 7, in this case making the sides having the shape a part of an ellipse. The wall segment 9 would have a shape corresponding to the given shape of the aperture segment 10.

FIG. 8 illustrates in perspective a manufacturing method of a wind turbine tower part where a cart with an aperture segment is moved to a position in proximity of a fixating unit with a wall segment. The figure further illustrates a rolling mill 13 with the ready-made wall segment 9 mounted.

In this embodiment of the invention the rolling mill 13 functions as a fixating unit 12. An aperture segment 10 is mounted and fixated on a cart 14 by holding means 15 in the door aperture 7. In this embodiment of the invention the cart 14 is provided with wheels 16 to make the cart moveable either by pushing or pulling the cart 14 or by providing the cart 14 with driving means such as an electrical motor (not shown) or another kind of motor.

FIG. 9 illustrates the cart 14 with the fixated aperture segment 10 in a tilted position. In this embodiment of the invention a part of the cart 14 whereon the aperture segment 10 is mounted is tilted e.g. by means of hydraulics, pneumatics or an electrical motor or another kind of motor (not shown).

Figure 10:
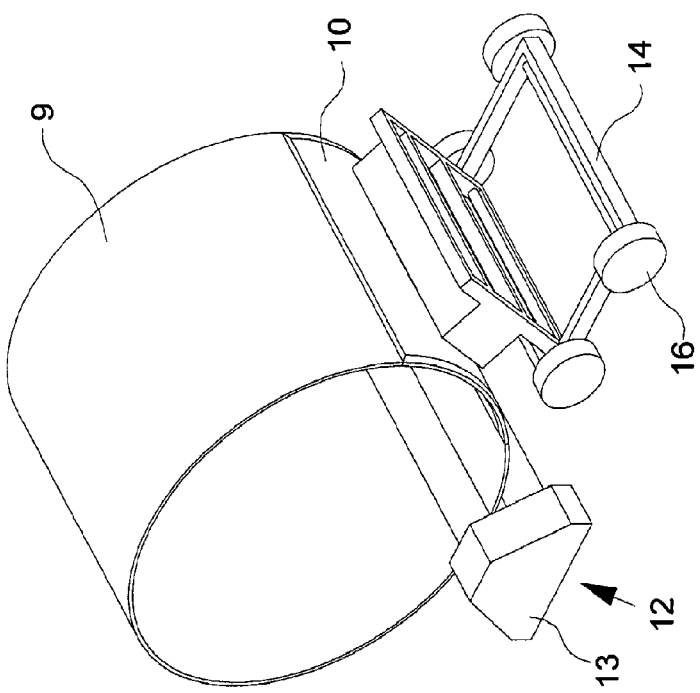
FIG. 10 illustrates a method step where the cart with the aperture segment in a tilted position is brought in position for joining with the wall segment in the fixating unit.

FIG. 10 illustrate the cart 14 with the aperture segment 10 in a tilted position brought in a position where it is possible to join the wall segment 9 and the aperture segment 10 preferably by welding.

Figure 11:
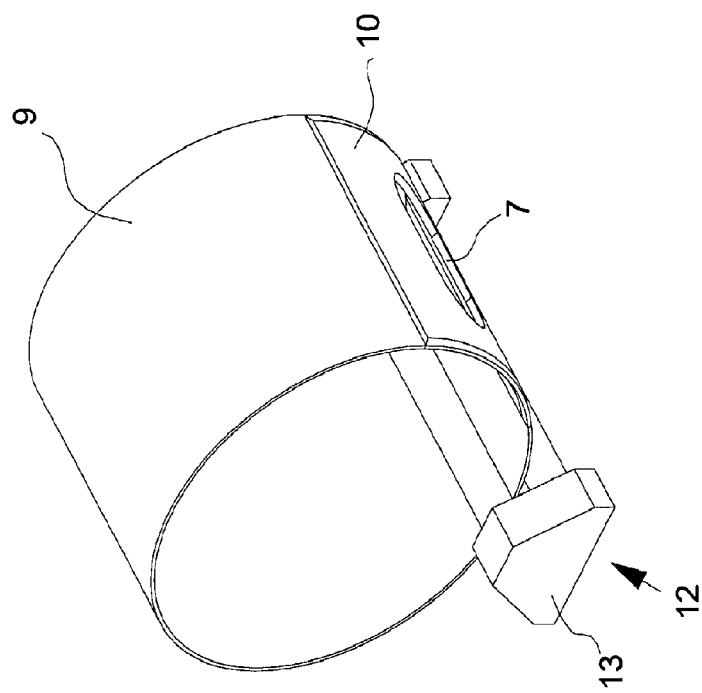
FIG. 11 illustrates a further method step where the wall segment is joined with the aperture segment.

FIG. 11 illustrates a wall segment 9 still mounted in the fixating unit 12 joined with the aperture segment 10, so that they together in this embodiment of the invention constitutes a full 360° tower part 6.

Figure 12:
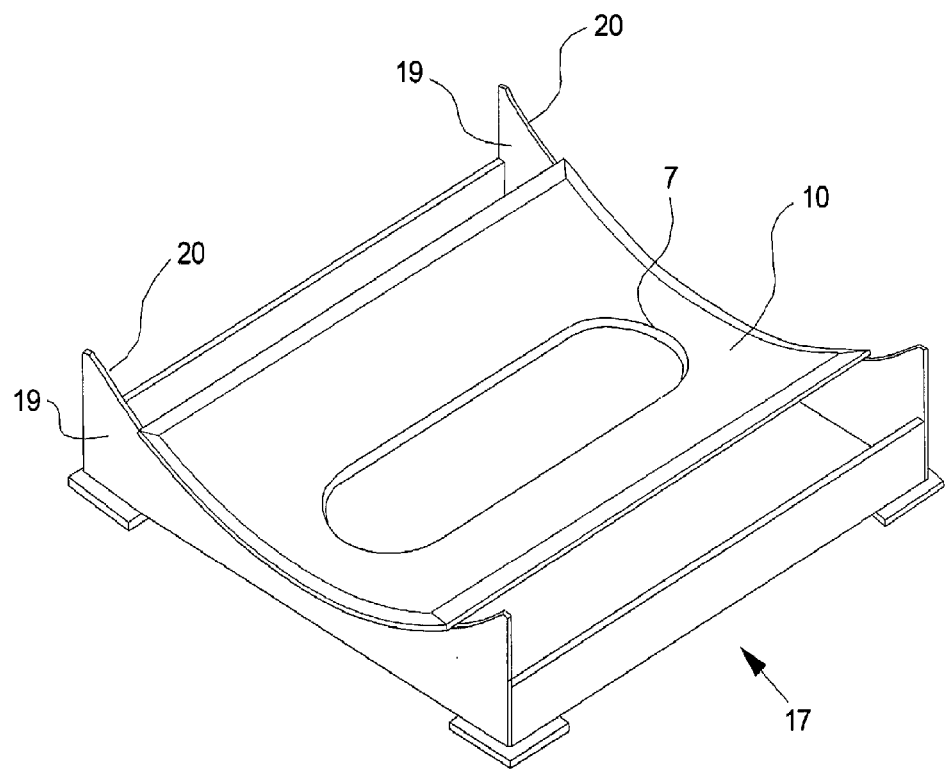
FIG. 12 illustrates in perspective another manufacturing method of a wind turbine tower part where an aperture segment is positioned in a fixating unit.

FIG. 12 illustrates in perspective another manufacturing method of a wind turbine tower part where an aperture segment 10 is positioned in a fixating unit 17.

The fixture plates 19, on which the aperture segment 10 is placed, are provided with an arcuate shaped edge 20 at the top, which corresponds with the outer diameter of a specific tower part 6.

Figure 13:
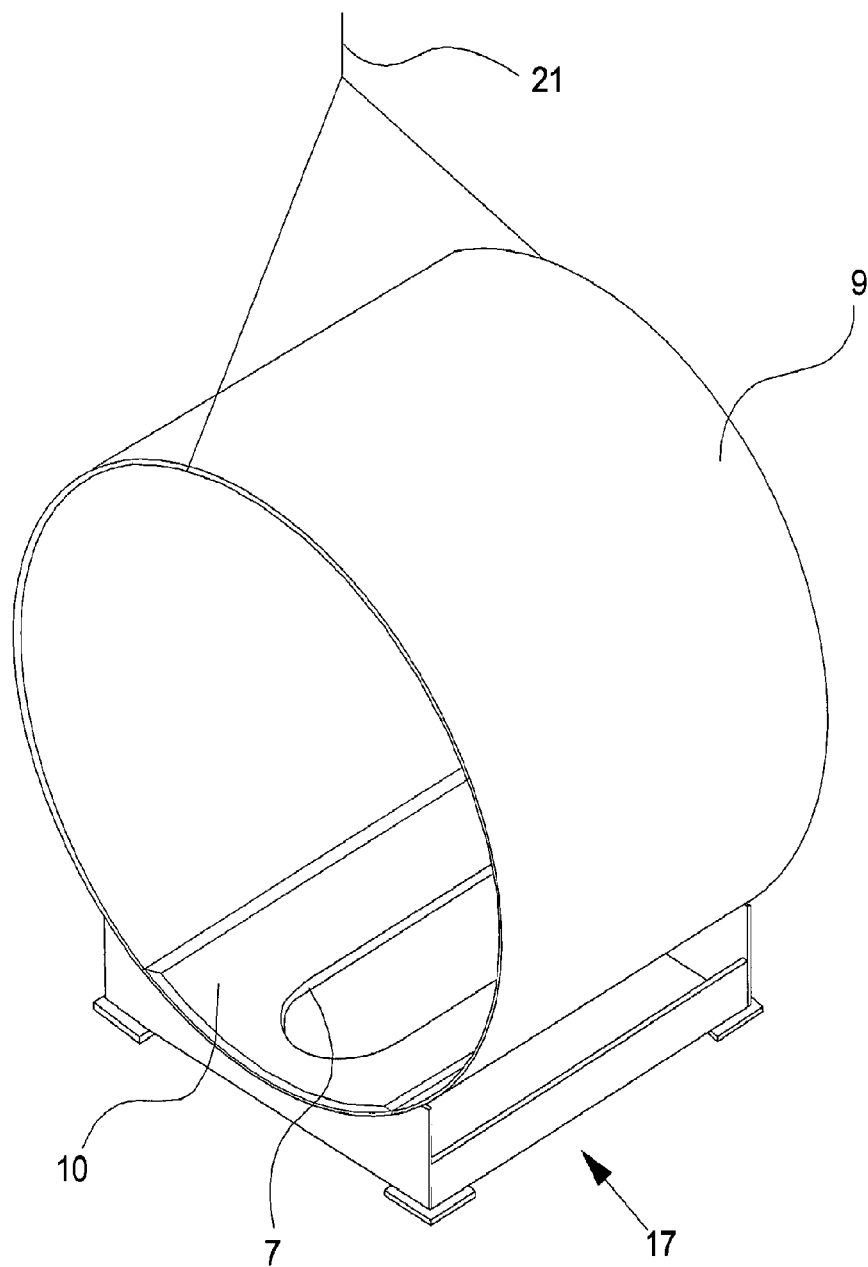
FIG. 13 illustrates a further method step including the lowering of a wall segment to the fixating unit with an aperture segment and connecting the segments.

FIG. 13 illustrates a further method step including the lowering of a wall segment to the fixating unit with an aperture segment and connecting the segments.

The wall segment 9 is hoisted down, by some kind of hoisting means 21, in joining position on the fixating unit 17, where the aperture segment 10 already has been placed. When joined the segments constitutes a full 360° tower part 6, which can be hoisted off the fixating unit 17 as one part.

LIST

1. Wind turbine
2. Tower
3. Nacelle
4. Rotor
5. Blades
6. Tower part
7. Aperture
8. Door
9. Wall segment
10. Aperture segment
11. Sharpening
12. Fixating unit
13. Rolling mill
14. Cart
15. Holding means
16. Wheels
17. Fixating unit
18. Foundation
19. Fixture plates
20. Arcuate shaped edge
21. Hoisting means
22. Tower ring
23. Hinge

The invention claimed is:

1. A tower part for a wind turbine comprising:
a wall segment including an upper edge, a lower edge, and opposing side edges; and
an aperture segment including an upper edge, a lower edge, opposing side edges configured to directly abut said opposing side edges of said wall segment, and at least one aperture, said wall segment and said aperture segment being connected by connecting means,
wherein said aperture segment is of a substantially uniform thickness and is thicker than a thickness of said wall segment,
wherein said wall segment and said aperture segment form segments of a ring and when connected by said connecting means constitute a full 360° tower ring, with said upper edges of said wall segment and said aperture segment defining an upper end of said tower ring and said lower edges of said wall segment and said aperture segment defining a lower end of said tower ring, said upper and lower ends of said tower ring configured to be connected to additional tower rings located above and below said wall segment and said aperture segment, and
wherein said wall segment and said aperture segment define structural supporting elements for said tower ring that operate to support and transfer loads and forces through said tower ring, wherein the connection of said opposing side edges of said wall segment and said aperture segment by said connecting means is the only connection of structural supporting elements between said upper and lower ends of said tower ring in which the connection affects the fatigue limit and strength of said tower ring, and
wherein said tower ring includes at least one additional structural supporting element, selected from a group consisting of a door frame and a door, and said at least one additional structural supporting element is connected to said wall segment or said aperture segment in such a manner that the connection does not affect the fatigue limit and strength of said tower ring, thereby avoiding a reduction in fatigue limit of said tower ring that would be caused by welding or other fixed attachment of said at least one additional structural supporting element.

2. The tower part according to claim 1, wherein
said aperture segment includes a periphery defined by a plurality of generally straight edges including said opposing side edges.

3. The tower part according to claim 2, wherein said one wall segment and said aperture segment are connected by welding along at least one of the plurality of generally straight edges.

4. The tower part according to claim 1,
wherein at least one of the upper edges or the lower edges of said wall segment and said aperture segment are located at substantially the same height.

5. The tower part according to claim 1, wherein said tower ring is configured for joining to neighboring tower rings of a wind turbine tower by connection means including at least one of screws, bolts, rivets, gluing, or welding.

6. The tower part according to claim 1, wherein at least two edges on said aperture segment are sharpened to narrow in thickness adjacent a connection to said wall segment, said at least two edges defining a thickness substantially equivalent to the thickness of said wall segment, which is thinner than the substantially uniform thickness at a remainder of said aperture segment.

7. A tower part for a wind turbine comprising:
a wall segment; and
an aperture segment including at least one aperture, said wall segment and said aperture segment being connected by connecting means,
wherein said aperture segment is of a substantially uniform thickness and is thicker than a thickness of said wall segment,
wherein said wall segment and said aperture segment form segments of a ring and when connected by said connecting means constitute a full 360° ring, and
wherein at least two edges on said aperture segment are sharpened to narrow in thickness adjacent a connection to said wall segment, said at least two edges defining a thickness substantially equivalent to the thickness of said wall segment, which is thinner than the substantially uniform thickness at a remainder of said aperture segment.

8. The tower part according to claim 7, wherein said aperture segment constitutes between 5° and 180°, preferably between 30° and 100°, and most preferably between 40° and 80° of the full 360° ring.

9. The tower part according to claim 7, wherein said aperture segment has a width which is between 10% and 500%, preferably between 50% and 300%, and most preferably between 100% and 200% wider than the total width of the at least one aperture as seen in a horizontal cross section of the aperture segment where the at least one aperture is widest.

10. The tower part according to claim 7, wherein at least two opposite edges on both a concave and a convex side of said aperture segment are sharpened to narrow the thickness at said at least two opposite edges substantially to the thickness of said wall segment.

11. The tower part according to claim 10, wherein said aperture segment is four sided, and all four edges on both the concave and the convex side of said aperture segment are sharpened.

12. The tower part according to claim 7, wherein a pitch diameter of said aperture segment is substantially the same as a pitch diameter of said wall segment.

13. The tower part according to claim 7, wherein a pitch diameter of said aperture segment is smaller than a pitch diameter of said wall segment.

14. The tower part according to claim 7, wherein said aperture segment is between 10% and 500%, preferably between 50% and 250%, and most preferably between 80% and 180% thicker than a thickness of said wall segment.

15. The tower part according to claim 7, wherein said aperture segment is of substantially the same height as said wall segment.

16. The tower part according to claim 7, wherein said at least one aperture in said aperture segment is a door aperture with a door connected to said aperture segment by one or more magnetic hinges.

17. The tower part according to claim 16, wherein said door aperture is of a substantially oval shape with vertical parallel sides and round endings in a longitudinal direction.

18. The tower part according to claim 7, wherein at least one of said aperture segment and said wall segment is formed by rolling a sheet into a segment defining less than 360° of a full ring.

19. The tower part according to claim 7, wherein the at least one aperture comprises at least one of door openings, cable openings, and openings for ventilation or warning lights.

20. The tower part according to claim 7, wherein
said aperture segment is formed by rolling a sheet into a segment defining less than 360° of a full ring, such that said aperture segment includes said at least one aperture and said at least two edges configured to directly abut opposing side edges of said wall segment, said wall segment and said aperture segment being connected by connecting means.

21. The tower part according to claim 20, wherein said wall segment is formed by rolling a sheet into a segment defining less than 360° of a full ring.

22. The tower part according to claim 20, wherein said aperture segment includes a periphery defined by a plurality of generally straight edges, and said wall segment and said aperture segment are connected by welding along at least one of the plurality of generally straight edges.

23. The tower part according to claim 20, wherein the full 360° ring defined by said wall segment and said aperture segment is formed by fixating one of said wall segment and said aperture segment in a fixating unit, moving the other of said wall segment and said aperture segment in proximity of the fixating unit, and connecting said wall segment and said aperture segment with the connection means.

24. The tower part according to claim 20, wherein said at least two edges on said aperture segment are sharpened after rolling to narrow in thickness adjacent a connection to said wall segment.

25. The tower part according to claim 24, wherein said aperture segment is four-sided and includes upper and lower edges in addition to said at least two edges, and wherein said upper and lower edges are sharpened before rolling to narrow in thickness adjacent a connection to another tower part.

26. The tower part according to claim 7, wherein the full 360° ring is configured for joining to neighboring tower rings of a wind turbine tower by connection means including at least one of screws, bolts, rivets, gluing, or welding.

\* \* \* \* \*